United States Patent
Rong et al.

(10) Patent No.: US 10,113,107 B2
(45) Date of Patent: Oct. 30, 2018

(54) METHOD FOR PREPARING SELF-SUSPENDING FRACTURING PROPPANT

(71) Applicant: Shandong Nuoer Biological Technology Co., Ltd., Dongying (CN)

(72) Inventors: Minjie Rong, Dongying (CN);
Yongsheng Xu, Dongying (CN);
Qinghua Yu, Dongying (CN)

(73) Assignee: SHANDONG NUOER BIOLOGICAL TECHNOLOGY CO., LTD., Dongying (CN)

( * ) Notice: Subject to any disclaimer, the term of this patent is extended or adjusted under 35 U.S.C. 154(b) by 45 days.

(21) Appl. No.: 15/369,863

(22) Filed: Dec. 5, 2016

(65) Prior Publication Data

US 2017/0275524 A1 Sep. 28, 2017

(30) Foreign Application Priority Data

Mar. 25, 2016 (CN) .......................... 2016 1 0174876

(51) Int. Cl.
*C09K 8/80* (2006.01)

(52) U.S. Cl.
CPC .................................... *C09K 8/805* (2013.01)

(58) Field of Classification Search
CPC ........ E21B 43/267; E21B 43/26; E21B 43/14;
E21B 47/011; E21B 47/06; E21B 47/16;
E21B 47/065; E21B 34/14; E21B 47/18;
E21B 10/567; E21B 10/573; E21B 17/05;
E21B 21/02; E21B 33/10; E21B 33/12;
E21B 43/25; E21B 43/261; E21B 49/087;
E21B 4/02; E21B 7/007; E21B 7/067;
C09K 8/68; C09K 8/805; C09K 2208/10;
C09K 2208/34; C09K 3/1418; C09K
8/00; C09K 8/467; C09K 8/473; C09K
8/48; C09K 8/487; C09K 8/528; C09K
8/602; C09K 8/62; C09K 8/64; C09K
8/80; C09K 8/82; C09K 8/86; C09K
8/88; C09K 8/882; C09K 8/887; C09K
8/90

See application file for complete search history.

(56) References Cited

U.S. PATENT DOCUMENTS

2010/0065271 A1* 3/2010 McCrary ................ C09K 8/805
166/278

* cited by examiner

*Primary Examiner* — Kumar R Bhushan
(74) *Attorney, Agent, or Firm* — Matthias Scholl, PC;
Matthias Scholl

(57) ABSTRACT

A method for preparing self-suspending fracturing proppant, the method including: stiffing and adding 100 g of a proppant to between 1 and 3 g of a surface treating agent until the surface treating agent is uniformly distributed on a surface of the proppant; adding between 0.5 and 2 g of a thickener in the form of a powder to the resulting mixture and stiffing uniformly.

5 Claims, No Drawings

METHOD FOR PREPARING SELF-SUSPENDING FRACTURING PROPPANT

CROSS-REFERENCE TO RELATED APPLICATIONS

Pursuant to 35 U.S.C. § 119 and the Paris Convention Treaty, this application claims the benefit of Chinese Patent Application No. 201610174876.7 filed Mar. 25, 2016, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Ma 02142.

BACKGROUND OF THE INVENTION

Field of the Invention

The invention relates to a method for preparing self-suspending fracturing proppant.

Description of the Related Art

Conventional fracturing methods adopt guar gum or polymers as fracturing fluids. However, the output and price of the guar gum are greatly affected by the climate. In addition, polymer solutions have poor resistance to high temperature and high salinity, the crosslinking time of the polymers is variable, and the sand suspension effect is poor. Furthermore, the fracturing device is often overloaded when polymers are used due to their viscosity.

SUMMARY OF THE INVENTION

In view of the above-described problems, it is one objective of the invention to provide a method for preparing self-suspending fracturing proppant that is economic and the produced proppant features excellent suspension effect, excellent temperature and salt resistance.

To achieve the above objective, in accordance with one embodiment of the invention, there is provided a method for preparing self-suspending fracturing proppant. The method comprises:
  a) stirring and adding 100 g of a proppant to between 1 and 3 g of a surface treating agent until the surface treating agent is uniformly distributed on a surface of the proppant; and
  b) adding between 0.5 and 2 g of a thickener in the form of a powder to a resulting mixture and stirring uniformly.

In a class of this embodiment, the surface treating agent is prepared as follows: 300 g of N,N-dimethylaminoethyl methacrylate, 100 g of octadecyldimethyl-p-methylstyrene ammonium chloride, 30 g of acrylic acid, 5 g of acrylamide, 10 g of butanediol, 50 g of sorbitan monostearate, and 300 g of water are added to a reactor, stirred and heated to a temperature of 50° C.; 5 g of potassium persulfate and 3 g of sodium bisulfite are added to a resulting mixture for reaction, during which, a temperature is controlled at less than or equal to 80° C. until reaction is completed; then the temperature is decreased to a room temperature. Octadecyldimethyl-p-methylstyrene ammonium chloride is an irreplaceable functional substance for hydrophobic association.

In a class of this embodiment, the thickener is prepared as follows: between 150 and 220 parts by weight of acrylamide, between 15 and 28 parts by weight of N-hydroxymethyl acrylamide, between 2 and 5 parts by weight of 1,4-butanediol, between 1 and 3 parts by weight of glycerin, between 2 and 6 parts by weight of 2-acrylamido-2-methylpropanesulfonic acid, between 24 and 48 parts by weight of allyloxy hydroxypropyl sodium sulfonate, between 20 and 40 parts by weight of methacrylate hydroxypropyl sodium sulfonate, between 1 and 6 parts by weight of a crosslinking inhibitor, and between 600 and 700 parts by weight of deionized water are added to a reactor; then between 0.2 and 0.8 part by weight of an initiator is added to the reactor at a temperature of between 2 and 5° C. to initiate polymerization, during which, a temperature of a reaction system increases and a temperature peak reaches between 65 and 70° C.; after the reaction, a colloid is collected, granulated, dried, and crushed into particles having a diameter smaller than 100 μm. The temperature peak of the polymerization reaction does not exceed 70° C., or else, insoluble matters in the products will increase and the quality of the products will be affected. 1,4-butanediol and glycerin are two important raw materials and serve as product protectors which functions in crosslinking prior to the hydroxyl radicals of the main chain in the drying process. Because a plurality of hydroxyl radicals exists in 1,4-butanediol and glycerin, such crosslinking hardly affects the solubility of the products. In addition, the number of the hydroxyl radicals of the main chain increases after the crosslinking, so that the application effect is enhanced.

In a class of this embodiment, the proppant is a ceramic sand or a quartz sand having a particle size of between 20 and 100 meshes.

In a class of this embodiment, a weight ratio of allyloxy hydroxypropyl sodium sulfonate to methacrylate hydroxypropyl sodium sulfonate is 1.2:1.

In a class of this embodiment, the crosslinking inhibitor is an aqueous solution comprising polyethylene glycol 400 and sodium phosphite; and a weight ratio of polyethylene glycol 400:sodium phosphite:water is 10:13:65.

In a class of this embodiment, the initiator is potassium persulfate and sodium bisulfite.

Advantages of the method for preparing self-suspending fracturing proppant according to embodiments of the invention are summarized as follows:
  1. The proppant prepared by the method of embodiments of the invention has good suspension effect, and possesses crosslinking and hydrophobic association functions. The viscosity of the product after crosslinking has small viscosity, so that the overloading problem of the device due to the too large viscosity of the fracturing using polymers is solved.
  2. The fracturing system adopting the proppant of the invention is excellent in temperature resistance and salt resistance. In condition of high temperature and high salt, the fracturing system has much stronger hydrophobic association effect and better sand suspension effect.
  3. It is not necessary to add antibacterial agents to the fracturing system using the proppant of the invention, thus being much economic.
  4. The application concentration of the conventional thickener is between 0.4 and 0.8 percent by weight, while the dose of the substitute herein is reduced to between 0.1 and 0.2 percent by weight, which not only ensures the use effect but also reduces the consumption of the thickener.
  5. The use of the proppant is convenient in the site. A dissolving device can be deleted, and the labor and the energy consumption are also saved.

DETAILED DESCRIPTION OF THE EMBODIMENTS

For further illustrating the invention, experiments detailing a method for preparing self-suspending fracturing proppant are described below. It should be noted that the following examples are intended to describe and not to limit the invention.

A method for preparing self-suspending fracturing proppant, comprises: stirring and adding 100 g of a proppant to between 1 and 3 g of a surface treating agent until the surface treating agent is uniformly distributed on a surface of the proppant; adding between 0.5 and 2 g of a thickener in the form of a powder to a resulting mixture and stirring uniformly.

EXAMPLE 1

1. Proppant: ceramic sand (between 20 and 40 meshes)
2. Method for preparing the surface treating agent: 300 g of N,N-dimethylaminoethyl methacrylate, 100 g of octadecyldimethyl-p-methylstyrene ammonium chloride, 30 g of acrylic acid, 5 g of acrylamide, 10 g of butanediol, 50 g of sorbitan monostearate, and 300 g of water were added to a reactor, stirred and heated to a temperature of 50° C. 5 g of potassium persulfate and 3 g of sodium bisulfite were added to a resulting mixture for reaction, during which, a temperature was controlled at less than 80° C. until reaction is completed. Then the temperature was decreased to the room temperature.
3. Method for preparing the thickener:

Doses of substances (parts by weight) involved in the preparation of the thickener were as follows:

acrylamide 220
N-hydroxymethyl acrylamide 19
1,4-butanediol 5
glycerin 3
2-acrylamido-2-methylpropanesulfonic acid 3
allyloxy hydroxypropyl sodium sulfonate 24
methacrylate hydroxypropyl sodium sulfonate 20
a crosslinking inhibitor 1.8
deionized water 626
potassium persulfate 0.16
sodium bisulfite 0.09

The preparation process of the thickener was specifically as follows:

1) deionized water, acrylamide, N-hydroxymethyl acrylamide, 1,4-butanediol, glycerin, allyloxy hydroxypropyl sodium sulfonate, methacrylate hydroxypropyl sodium sulfonate, crosslinking inhibitor, 2-acrylamido-2-methylpropanesulfonic acid were added to the reactor.

2) nitrogen gas was introduced to the reactor for deoxygenation for 30 min. The initiator was then added to the reactor at 3° C. to initiate the polymerization. With the progress of the reaction, the temperature of the system gradually increased, and a maximum reaction temperature reached 69° C.

3) After the reaction, a colloid was collected to granulate. Resulting colloidal particles was thereafter dried at 70° C. and crushed to yield the thickener. Indicators of the yielded thickener are shown in Table 1.

TABLE 1

| Molecular weight | Applied concentration | Temperature resistance | Salinity | Insoluble matters | Dissolving time |
|---|---|---|---|---|---|
| 300 million | 0.2 percent by weight | <90° C. | <30000 | 0.01 percent by weight | <3 min |

4. The 100 parts by weight of the ceramic sands were collected, stirred and added with 2 weight parts of the surface treating agent until the surface treating agent is uniformly distributed on the surface of the proppant. After that, 0.6 weight part of the thickener in the form of the powder was added and a resulting mixture was stirred to be uniform.

EXAMPLE 2

1. Proppant: ceramic sand (between 40 and 70 meshes)
2. Method for preparing the surface treating agent: 300 g of N,N-dimethylaminoethyl methacrylate, 100 g of octadecyldimethyl-p-methylstyrene ammonium chloride, 30 g of acrylic acid, 5 g of acrylamide, 10 g of butanediol, 50 g of sorbitan monostearate, and 300 g of water were added to a reactor, stirred and heated to a temperature of 50° C. 5 g of potassium persulfate and 3 g of sodium bisulfite were added to a resulting mixture for reaction, during which, a temperature was controlled at less than 80° C. until reaction is completed. Then the temperature was decreased to the room temperature.
3. Method for preparing the thickener:

Doses of substances (parts by weight) involved in the preparation of the thickener were as follows:

acrylamide 180
N-hydroxymethyl acrylamide 24
1,4-butanediol 3
glycerin 1.8
2-acrylamido-2-methylpropanesulfonic acid 4
allyloxy hydroxypropyl sodium sulfonate 36
methacrylate hydroxypropyl sodium sulfonate 30
a crosslinking inhibitor 2.5
deionized water 638
potassium persulfate 0.2
sodium bisulfite 0.12

The preparation process of the thickener was specifically as follows:

1) deionized water, acrylamide, N-hydroxymethyl acrylamide, 1,4-butanediol, glycerin, allyloxy hydroxypropyl sodium sulfonate, methacrylate hydroxypropyl sodium sulfonate, crosslinking inhibitor, 2-acrylamido-2-methylpropanesulfonic acid were added to the reactor.

2) nitrogen gas was introduced to the reactor for deoxygenation for 30 min. The initiator was then added to the reactor at 3° C. to initiate the polymerization. With the progress of the reaction, the temperature of the system gradually increased, and a maximum reaction temperature reached 67° C.

3) After the reaction, a colloid was collected to granulate. Resulting colloidal particles was thereafter dried at 70° C. and crushed to yield the thickener. Indicators of the yielded thickener are shown in Table 2.

TABLE 2

| Molecular weight | Applied concentration | Temperature resistance | Salinity | Insoluble matters | Dissolving time |
|---|---|---|---|---|---|
| 400 million | 0.1 percent by weight | <120° C. | <80000 | 0.02 percent by weight | <5 min |

4. The 100 parts by weight of the ceramic sands were collected, stirred and added with 2.5 weight parts of the surface treating agent until the surface treating agent is uniformly distributed on the surface of the proppant. After that, 0.3 weight part of the thickener in the form of the powder was added and a resulting mixture was stirred to be uniform.

EXAMPLE 3

1. Proppant: ceramic sand (between 20 and 40 meshes)

2. Method for preparing the surface treating agent: 300 g of N,N-dimethylaminoethyl methacrylate, 100 g of octadecyldimethyl-p-methylstyrene ammonium chloride, 30 g of acrylic acid, 5 g of acrylamide, 10 g of butanediol, 50 g of sorbitan monostearate, and 300 g of water were added to a reactor, stirred and heated to a temperature of 50° C. 5 g of potassium persulfate and 3 g of sodium bisulfite were added to a resulting mixture for reaction, during which, a temperature was controlled at less than 80° C. until reaction is completed. Then the temperature was decreased to the room temperature.

3. Method for preparing the thickener:

Doses of substances (parts by weight) involved in the preparation of the thickener were as follows:

acrylamide 150

N-hydroxymethyl acrylamide 28

1,4-butanediol 2 glycerin 1

2-acrylamido-2-methylpropanesulfonic acid 6 allyloxy hydroxypropyl sodium sulfonate 48 methacrylate hydroxypropyl sodium sulfonate 40 a crosslinking inhibitor 5 deionized water 670 potassium persulfate 0.3 sodium bisulfite 0.18

The preparation process of the thickener was specifically as follows:

1) deionized water, acrylamide, N-hydroxymethyl acrylamide, 1,4-butanediol, glycerin, allyloxy hydroxypropyl sodium sulfonate, methacrylate hydroxypropyl sodium sulfonate, crosslinking inhibitor, 2-acrylamido-2-methylpropanesulfonic acid were added to the reactor.

2) nitrogen gas was introduced to the reactor for deoxygenation for 30 min. The initiator was then added to the reactor at 4° C. to initiate the polymerization. With the progress of the reaction, the temperature of the system gradually increased, and a maximum reaction temperature reached 65° C.

3) After the reaction, a colloid was collected to granulate. Resulting colloidal particles was thereafter dried at 70° C. and crushed to yield the thickener. Indicators of the yielded thickener are shown in Table 3.

TABLE 3

| Molecular weight | Applied concentration | Temperature resistance | Salinity | Insoluble matters | Dissolving time |
|---|---|---|---|---|---|
| 500 million | 0.2 percent by weight | <150° C. | <150000 | 0.06 percent by weight | <6 min |

4. The 100 parts by weight of the ceramic sands were collected, stirred and added with 3 weight parts of the surface treating agent until the surface treating agent is uniformly distributed on the surface of the proppant. After that, 0.5 weight part of the thickener in the form of the powder was added and a resulting mixture was stirred to be uniform.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing a self-suspending fracturing proppant, the method comprising:

a) adding 100 g of a proppant to between 1 and 3 g of a surface treating agent and stirring until the surface treating agent is uniformly distributed on a surface of the proppant to obtain a surface treating agent-coated proppant; and b) adding between 0.5 and 2 g of a thickener in the form of a powder to the surface treating agent-coated proppant to obtain a first mixture and stirring the first mixture to obtain the self-suspending fracturing proppant;

wherein:

the surface treating agent is prepared as follows: adding 300 g of N,N-dimethylaminoethyl methacrylate, 100 g of octadecyldimethyl-p-methylstyrene ammonium chloride, 30 g of acrylic acid, 5 g of acrylamide, 10 g of butanediol, 50 g of sorbitan monostearate, and 300 g of water to a reactor to obtain a second mixture; stirring and heating the second mixture to a temperature of 50° C. to obtain a third mixture; adding 5 g of potassium persulfate and 3 g of sodium bisulfite to the third mixture to obtain a fourth mixture; heating the fourth mixture at a temperature of less than or equal to 80° C. to obtain a fifth mixture; and cooling the fifth mixture to room temperature to obtain the surface treating agent.

2. A method for preparing a self-suspending fracturing proppant, the method comprising:

a) adding 100 g of a proppant to between 1 and 3 g of a surface treating agent and stirring until the surface treating agent is uniformly distributed on a surface of the proppant to obtain a surface treating agent-coated proppant; and b) adding between 0.5 and 2 g of a thickener in the form of a powder to the surface treating agent-coated proppant to obtain a first mixture and stirring the first mixture to obtain the self-suspending fracturing proppant;

wherein:
    the thickener is prepared as follows: adding between 150 and 220 parts by weight of acrylamide, between 15 and 28 parts by weight of N-hydroxymethyl acrylamide, between 2 and 5 parts by weight of 1,4-butanediol, between 1 and 3 parts by weight of glycerin, between 2 and 6 parts by weight of 2-acrylamido-2-methylpropanesulfonic acid, between 24 and 48 parts by weight of allyloxy hydroxypropyl sodium sulfonate, between 20 and 40 parts by weight of methacrylate hydroxypropyl sodium sulfonate, between 1 and 6 parts by weight of a crosslinking inhibitor, and between 600 and 700 parts by weight of deionized water to a reactor to obtain a second mixture; then adding between 0.2 and 0.8 part by weight of an initiator to the second mixture at a temperature of between 2 and 5° C. to initiate a polymerization reaction and then increasing the temperature to between 65 and 70° C. to obtain a colloid via the polymerization reaction; and granulating, drying, and crushing the colloid into particles having a diameter smaller than 100 μm to obtain the thickener.

3. The method of claim 1, wherein a weight ratio of the allyloxy hydroxypropyl sodium sulfonate to the methacrylate hydroxypropyl sodium sulfonate is 1.2:1.

4. The method of claim 2, wherein the crosslinking inhibitor is an aqueous solution comprising polyethylene glycol 400 and sodium phosphite; and a weight ratio of the polyethylene glycol 400 to the sodium phosphite to water is 10:13:65.

5. The method of claim 2, wherein the initiator is potassium persulfate and sodium bisulfite.

* * * * *